United States Patent [19]

Morrison

[11] 3,836,841
[45] Sept. 17, 1974

[54] ELECTROMAGNETIC DEVICE FOR DETERMINING THE CONDUCTANCE OF A NEARBY BODY BY A SINGLE SUPERCOOLED INDUCTOR COIL

[75] Inventor: H. Frank Morrison, Berkeley, Calif.
[73] Assignee: The Regents of the University of California, Berkeley, Calif.
[22] Filed: Jan. 15, 1973
[21] Appl. No.: 323,782

[52] U.S. Cl. .............................. 324/5, 324/3, 324/4, 324/6, 324/41
[51] Int. Cl. ........................ G01v 3/08, G01v 3/16
[58] Field of Search ............................ 324/3–8, 41, 324/43

[56] References Cited
UNITED STATES PATENTS

| | | | |
|---|---|---|---|
| 2,012,479 | 8/1935 | Planta | 324/3 X |
| 2,623,923 | 12/1952 | Zimmerman | 324/5 |
| 2,768,347 | 10/1956 | Hansen | 324/3 X |
| 3,156,850 | 11/1964 | Walters | 324/43 SC X |
| 3,202,909 | 8/1965 | Stewart | 324/3 |
| 3,470,461 | 9/1969 | Morse | 324/43 SC |
| 3,506,913 | 4/1970 | Lambe et al. | 324/43 R |
| 3,719,882 | 3/1973 | Pincus | 324/3 |

OTHER PUBLICATIONS

Goree, W. S., Superconducting Magnetometers – – – for Geophysical Measurements, IEEE Papers from Conference on Eng. in the Ocean, pp. 90(2)–92.

*Primary Examiner*—Gerard R. Strecker
*Attorney, Agent, or Firm*—Fleur, Hohbach, Test, Albritton & Herbert

[57] ABSTRACT

A towed electromagnetic prospecting device has a single inductor coil used for both transmitting and receiving secondary electromagnetic radiation from the ground which has been induced by the transmitted radiation. Such secondary fields from the ground are sensed as a change in the effective resistance of the superconducting inductive transmitter coil employed in the resonant resistance type bridge circuit.

7 Claims, 7 Drawing Figures

PATENTED SEP 17 1974

ELECTROMAGNETIC DEVICE FOR DETERMINING THE CONDUCTANCE OF A NEARBY BODY BY A SINGLE SUPERCOOLED INDUCTOR COIL

BACKGROUND OF THE INVENTION

The present invention is directed to an electromagnetic device for determining the conductance of a nearby body and more specifically to an aircraft towed device for making mineral surveys of the earth's surface.

Existing electromagnetic geophysical prospecting systems generally consist of a transmitter which induces current to flow in the ground and a remotely located receiver which measures a secondary field produced by the induced currents. Since such secondary field must be measured in the presence of the much larger primary field of the transmitter, complex nulling or orientation measures are required which limit sensitivity.

Another type of system is illustrated in U.S. Pat. No. 1,325,554 with Carlson and Hanson as inventors and No. 2,018,080 granted to Martienssen. Both of these patents utilize a single coil for transmitting and receiving and detect a change in inductance. Such change in inductance is measurable only when the body to be measured is at distances of approximately the same dimensions as the transmitting loop. Thus, such unicoil devices cannot be practically airborne. In addition, higher frequencies which cannot sufficiently penetrate the ground must be used.

OBJECTS AND SUMMARY OF THE INVENTION

It is, therefore, an object of this invention to provide an improved electromagnetic device for determining the conductance of a nearby body.

It is a more specific object of the invention to provide a device as above which may be towed by an aircraft above the ground yet still provide sufficient sensitivity for geophysical prospecting.

It is another object of the invention to provide a towed device as above where measurement sensitivity is substantially unaffected by the towing aircraft.

In accordance with the above objects there is provided an electromagnetic device for determining the conductance of a nearby body. A magnetic dipole is provided for radiating an oscillating magnetic field towards the body. The magnetic dipole is supercooled to a temperature where the dipole is in a superconducting state. Means are provided for sensing an out-of-phase (90°) field with respect to the radiated field and which is produced by eddy currents in the body in response to the radiated field including resistance bridge means which sense a change in the effective resistance of the magnetic dipole caused by the out-of-phase field, the change in resistance being related to the conductance of said body.

DETAILED DESCRIPTION OF THE PREFERRED EMBODIMENT

Figure 1:
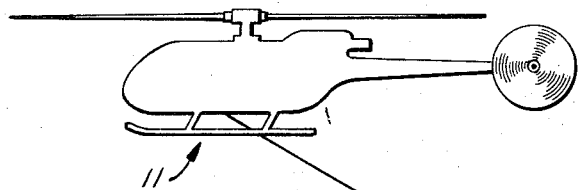
FIG. 1 is an elevation view of an aircraft towing the device embodying the present invention.

FIG. 1 in general shows a flight cryostat and air frame 10 being towed by a helicopter 11 above the ground surface at, for example, an altitude of 300 feet and tied together by a towing cable 12 which might typically have a length of 100 feet.

Figure 4:
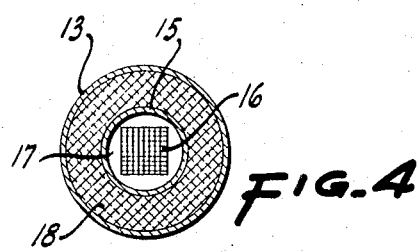
FIG. 4 is an enlarged cross-sectional view taken along line 4—4 of FIG. 3.
Figure 2:
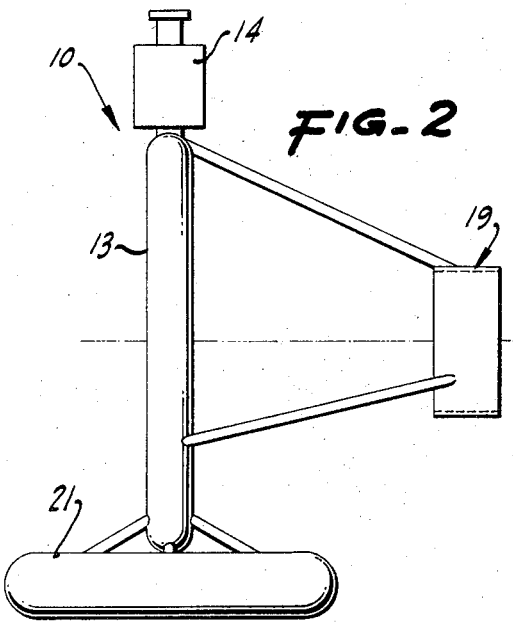
FIG. 2 is an enlarged elevation view of the device of FIG. 1.
Figure 3:
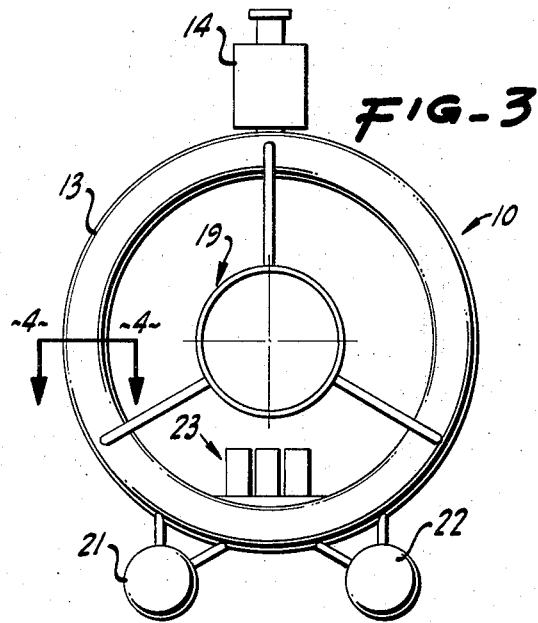
FIG. 3 is an end view of FIG. 2.

FIGS. 2, 3 and 4 illustrate the flight cryostat and the air frame 10 in greater detail. Referring now to all of these figures, the flight cryostat consists of an outer circular fiberglass non-metallic ring or shell 13 coupled to a liquid helium reservoir 14 and an inner ring or shell 15 illustrated best in FIG. 4 which contains coil or inductor 16. Liquid helium is allowed to circulate within the inner shell 15 in contact with coil 16 in the space indicated as 17. Between the inner shell 15 and the outer shell 13 is a vacuum space which is indicated at 18 which is filled with superinsulation. Specifically, this would typically be 100 layers of aluminized mylar and nylon net. Such superinsulation when coupled with a low vacuum of, for example, $10^{-3}$ microns of mercury, will permit a maximum heat leak loss of under 3 watts. The liquid helium reservoir 14 may contain approximately 110 liters. A stabilizing ring 19 serves as the tail of the air frame to provide aerodynamic stability. Landing pods 21 and 22 consist of large low pressure air bags to minimize shock during landing. In addition, circuit components such as the necessary capacitors, etc. are illustrated as being mounted at 23. The liquid helium provides a supercooling of the coil 16 or magnetic dipole, which radiates a magnetic field toward the ground, approaching absolute 0° Kelvin or from a practical standpoint 4.2° Kelvin.

Figure 5:
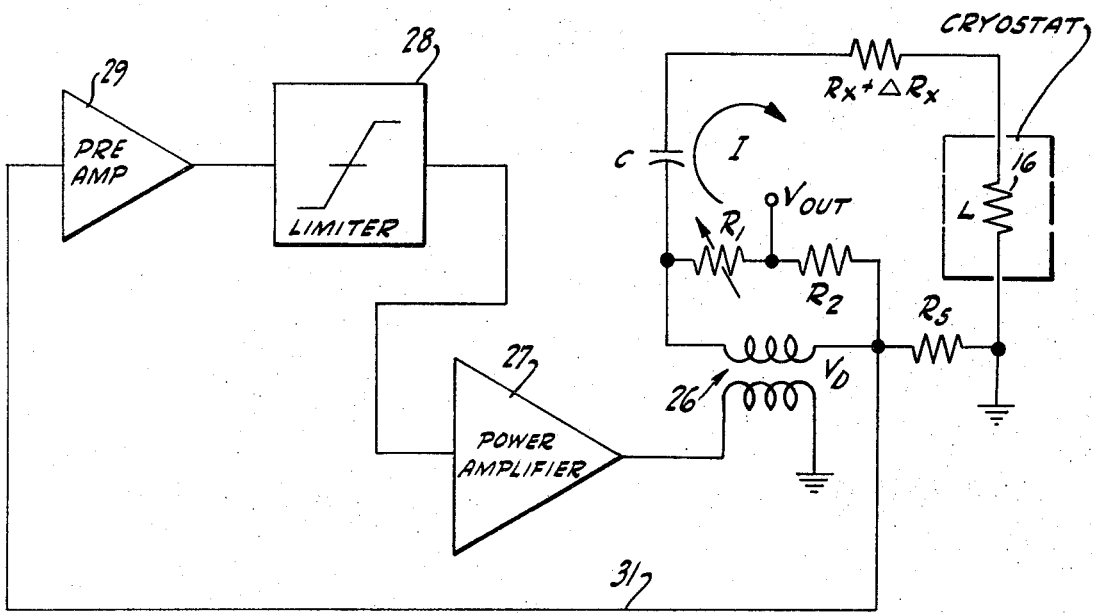
FIG. 5 is a circuit schematic embodying the present invention.

The circuit driving the coil 16 to produce such magnetic field can also detect changes in conductivity of the earth as illustrated in FIG. 5. Coil 16, indicated as L, is shown as surrounded by a cryostat. In series with coil 16 is its equivalent internal resistance $R_x$ and a capacitor C. Also in the circuit are external resistors $R_s$, $R_2$ and resistor $R_1$ which is variable. A voltage $V_{out}$ is tapped off between $R_1$ and $R_2$. A positive feedback oscillator is in effect provided by the regenerative or positive feedback loop which includes the drive transformer 26 which is driven by the power amplifier 27, limiter 28, and preamplifier 29. The feedback loop is completed by a line 31 which taps off a voltage between $V_{out}$ and $R_s$ and couples it back to the input preamplifier 29 to provide a driving voltage $V_d$ as indicated. With such a circuit, the frequency of oscillation will tend to be the resonant frequency of the tank circuit which consists of inductor 16 and capacitor C. In accordance with well known theory such frequency is the reciprocal of the square root of the product of L and C.

The limiter 28 provides a control of the current amplitude positive feedback. With the regenerative feedback, the driving circuit accurately tracks the resonant frequency of the L-C tank circuit. Thus, if the inductor 16 changes inductance slightly due to mechanical forces during its flight in the air such permutation will be tracked. This is important in the concept of the present invention as will become apparent below. A shift off of resonance would cause a change in the effective resistance of the tank circuit to produce an erroneous indication of earth conductance.

Figure 5A:
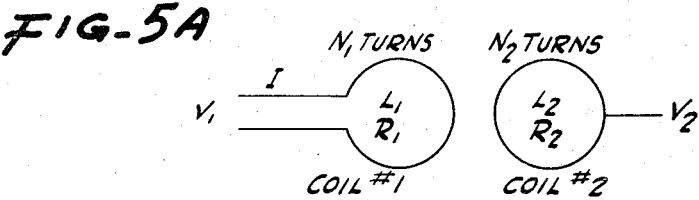
FIG. 5A is an equivalent circuit model useful in understanding the invention.

In order to predict the field response of the system, FIG. 5A is an appropriate model. This consists of a first coil of inductance $L_1$ and resistance $R_1$ equivalent to coil 16 driven by a voltage $V_1$ and a shorted turn coil which is equivalent to a subsurface conductive body which is to be detected. The voltage induced in coil number 2 by a changing current in coil 1 is given by $$V_2 = -M \, (dI_1/dt) \quad (1)$$

where $M$ is the mutual impedance of the two loops. The voltage $V_2$ produces a current $I_2$. The voltage drop across $L_2$ and $R_2$ is equal to the induced voltage $V_2$, that is, $$-M \, (dI_1/dt) = I_2 R_2 L_2 \, (dI_2/dt) \quad (2)$$

Assuming sinusoidal time dependence the solution for current in the shorted turn is $$I_2 = (i \omega I_1 M)/(R_2 + i\omega L_2) \quad (3)$$

The current $I_2$ of equation (3) now induces a voltage $\Delta V_1$ back into the coil number 1 which is given by:

$$\Delta V_1 = -M \, (dI_2/dt) \quad (4)$$

Differentiating equation (3) and substituting in equation (4) yields
$$\Delta V_1 = [(M^2 \omega^2 I_1)/(R_2^2 + \omega^2 L_2^2)] \, (R_2 - i \omega L_2) \quad (5)$$
The in-phase voltage change is in opposition to the driving voltage $V_1$ and thus may be considered equivalent to a change in resistance $\Delta R_1$:

$$\Delta R_1 = (M^2 \omega^2 R_2)/(R_2^2 + \omega^2 L_2^2) \quad (6)$$

Thus, equation (6) illustrates how the resistance $R_2$ of a buried subsurface body will affect the effective resistance of the magnetic dipole or radiating inductor 16.

From the foregoing equations, it is, of course, obvious that part of the secondary field produced by eddy currents in the body in response to the radiated field of the magnetic dipole is 90° out of phase with the radiated dipole field because of the differentiation process. In turn, the induced voltage in inductor 16 is 90° out-of-phase with the field from the body thus producing a 180° change of phase or a voltage opposition to the voltage across the inductor 16. Thus, $\Delta V_1$ of equation (5) is in voltage opposition to the driving voltage $V_1$.

As discussed above, it is clear that any disturbance in the field generated by the superconducting coil 16 produces a change in the apparent resistance $R_x$; that is, $\Delta R_x$ of the coil. The detection system is, therefore, in essence a resistance measuring circuit.

Figure 6:
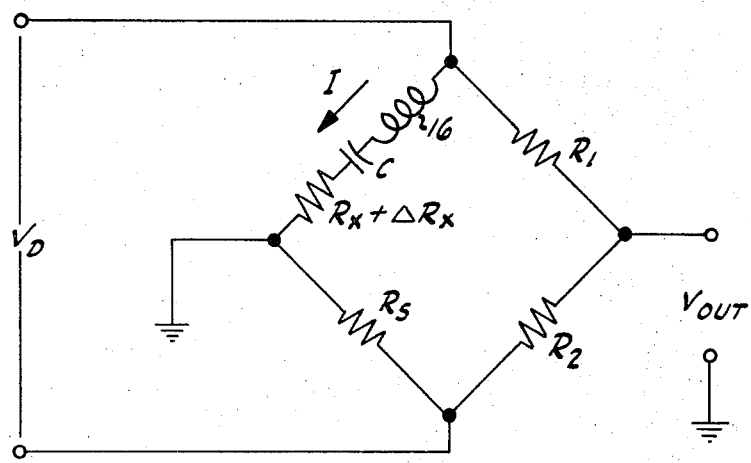
FIG. 6 is the circuit of FIG. 5 rearranged in a bridge format.

FIG. 6 is a redrawn portion of FIG. 5 which illustrates the actual Wheatstone bridge resistance bridge format of the circuit. One arm of the bridge is constituted by the inductor L or 16, capacitor C and the internal or effective resistance of that circuit $R_x$. At resonance of course the resistance of this arm is $R_x$. The bridge can be balanced by varying $R_1$. The resistance $R_s$ is made approximately equal to $R_x$. In the case of the balanced circuit, $$R_1/R_2 = R_x/R_s \quad (7)$$

and $$V_{out} = V_D \left( \frac{R_x}{R_s + R_x} - \frac{R_1}{R_1 + R_2} \right) = 0 \quad (8)$$

If the value of $R_x$ is changed by adding $\Delta R$ then the voltage $V_{out}$ is in the first approximation $$V_{out} = V_D \, (\Delta R/2R_s) \quad (9)$$

where $R_s$ is approximately equal to $R_x$. Thus, the output voltage $V_{out}$ of the circuit of FIGS. 5 and 6 is a measure of the change in effective resistance $R_x$ of the inductor circuit and of the radiating dipole 16 which in turn is related to earth conductance.

In general, the supercooling of the radiating dipole or inductor 16 provides two benefits. First, due to the lowered effective resistance of the inductor, a greater amount of radiated power output is achieved with low $I^2R$ losses. Secondly, with the lower resistance very small changes in resistance are now measurable from a practical standpoint. With traditional wire wound transmitters where the Q of the coil is low meaning a high inherent resistance, the change in resistance caused by a nearby varying conductor would be immeasurable. As an example of the foregoing, assume a loop or an inductor of one square meter area placed one meter above a ground having a 100 ohm meter resistivity, which loop will have a change in resistance or $\Delta R$ of 6.5 times $10^{-9}$ ohms. If the coil has 1,000 turns, the $\Delta R$ value becomes 6.5 times $10^{-3}$ ohms. The $\Delta R$ thus produced is on the threshold of measurement since the resistance of the coil is at least hundreds of ohms for any reasonable weight of wire. In comparison the super conducting transmitter of the present invention can detect $\Delta R$ values as low as $10^{-8}$ ohms. This is due to the fact that the coil resistance is on the order of milliohms rather than hundreds of ohms as in a conventional coil. In addition, the transmitter can operate at frequencies well below 1,000 Hz which provides significant penetration of the ground to detect subsurface deposits.

From a design standpoint, the transmitter coil 16 should be operated with a reasonably large moment which is the product of the number of turns, the current and effective area (NIA) and with as large (NA)² as possible. In addition, capacitors of relatively high Q of several thousand should be used.

One practical embodiment of the system of the present invention might utilize more than the single radiating frequency. For example, three different frequencies might be used with the individual coils in the same cryostat. The results can then be processed by computer to in effect map earth conductivity. For example, if the ground is layered and overburdened over bedrock, there will be a different conductivity observed for each frequency.

The use of the non-metallic cryostat which is essentially constructed of epoxy impregnated glass fiber eliminates any possible interference of the cryostat with the transmitting and receiving system.

Thus, the present invention has the advantage over the prior art of the elimination of relative coil location instability which was true in separate transmitter systems. Further, the constancy of orientation of the dipole is not critical since the response of a nearby conductor is changed by only a factor of two, to a first approximation, as the dipole changes its orientation by 90°. It overrides ambient noise since there is an inherently stronger magnetic field possible with the superconducting dipole. Exploration capabilities, in particular depth of exploration, are increased due to increased signal to noise ratio and the greater range of frequencies which may be used with the present system; especially the lower frequencies.

The device of the present invention is self-contained. By combining the transmitter and receiver the device can be attached to a helicopter without air frame modifications to the helicopter. However, it can equally well be used on the surface of the ground in, for example, petroleum prospecting applications.

A prototype of the foregoing device has been operated. It has been found that conducting bodies can be detected at distances comparable to the size of such bodies. Thus, an airborne device is feasible. In contrast, prior single coil mineral survey devices were essentially limited to distances comparable to the diameter of their transmitting loop.

I claim:

1. An electromagnetic device for determining the conductance of a nearby body comprising: a magnetic dipole for radiating a time varying magnetic field towards said body; means in proximity to said magnetic dipole for supercooling said magnetic dipole to a temperature where said dipole is in a superconducting state; means for sensing an out-of-phase field with respect to said radiated field and which is produced by said body in response to said radiated field including resistance bridge means including said magnetic dipole as a portion thereof for sensing solely a change in effective resistance of said magnetic dipole caused by said out-of-phase field, said change in resistance being related to said conductance of said body.

2. A device as in claim 1 where said resistance bridge means includes a capacitor coupled to said magnetic dipole and means for exciting said dipole and capacitor into a resonance condition.

3. A device as in claim 1 where said magnetic dipole is an inductor and where said resistance bridge means is of the Wheatstone type having four arms and includes a capacitor in series with said inductor in one arm of said bridge, together with means for exciting said inductor and capacitor into a series resonance condition, said other three arms of said bridge including resistors for normally balancing said bridge with respect to the effective resistance of said series resonant L-C circuit, a change in the effective resistance caused by said out-of-phase field being sensed by said bridge circuit.

4. A device as in claim 2 where said exciting means includes a regenerative feedback loop coupled to said bridge means whereby the resonant frequency of said dipole and capacitor is tracked.

5. A device as in claim 1 together with means for towing said device above the surface of the earth said nearby body being a subsurface inhomogeneity of said earth.

6. A device as in claim 1 where said means for supercooling is a non-metallic cryostat capable of cooling said dipole to substantially 4.2° K.

7. An electromagnetic device for determining the conductance of a nearby body comprising: a magnetic dipole having a predetermined inductance for radiating a time varying magnetic field towards said body; means in proximity to said magnetic dipole for supercooling said magnetic dipole to a temperature where said dipole is in a superconducting state; means for sensing an out-of-phase field with respect to said radiated field and which is produced by said body in response to said radiated field including resistance bridge means including said magnetic dipole as a portion thereof for sensing a change in effective resistance of said magnetic dipole caused by said out-of-phase field, said change in resistance being related to said conductance of said body, said resistance bridge means including a capacitor coupled to said magnetic dipole and means for exciting said dipole and capacitor into a resonance condition including a regenerative feedback loop coupled to said bridge means for tracking the resonant frequency of said dipole and capacitor in response to mechanical forces changing said inductance.

* * * * *